US012809081B2

(12) United States Patent
Wang et al.

(10) Patent No.: US 12,809,081 B2
(45) Date of Patent: Nov. 24, 2026

(54) AUTOMOTIVE DISPLAY AND BACKLIGHT MODULE THEREOF

(71) Applicant: AmTRAN Technology Co., Ltd., New Taipei City (TW)

(72) Inventors: Chih Kuei Wang, New Taipei City (TW); Min Hung Cheng, Taipei City (TW); Yu Hsiang Tsou, New Taipei City (TW)

(73) Assignee: AmTRAN Technology Co., Ltd., New Taipei City (TW)

( * ) Notice: Subject to any disclaimer, the term of this patent is extended or adjusted under 35 U.S.C. 154(b) by 0 days.

(21) Appl. No.: 19/333,329

(22) Filed: Sep. 18, 2025

(65) Prior Publication Data

US 2026/0211172 A1 Jul. 23, 2026

(30) Foreign Application Priority Data

Jan. 20, 2025 (TW) ................................ 114102374

(51) Int. Cl.
*F21V 8/00* (2006.01)

(52) U.S. Cl.
CPC ........... *G02B 6/0088* (2013.01); *G02B 6/009* (2013.01)

(58) Field of Classification Search
CPC ..... G02B 6/0088; G02B 6/009; G02F 1/1333; G02F 1/1335
See application file for complete search history.

(56) References Cited

U.S. PATENT DOCUMENTS

| | | | | |
|---|---|---|---|---|
| 11,747,548 | B2 * | 9/2023 | Arihara | G02B 6/0088 362/127 |
| 2014/0313773 | A1 | 10/2014 | Wu et al. | |
| 2018/0203298 | A1 | 7/2018 | Gai et al. | |
| 2018/0210143 | A1 | 7/2018 | Miyazaki | |
| 2019/0018184 | A1 | 1/2019 | Miyashita et al. | |
| 2024/0069386 | A1 * | 2/2024 | Choi | G02F 1/133615 |
| 2025/0237806 | A1 * | 7/2025 | Qin | G02B 6/0091 |

FOREIGN PATENT DOCUMENTS

| | | | |
|---|---|---|---|
| CN | 217982076 | U | 12/2022 |
| CN | 118884598 | A | 11/2024 |
| CN | 223284486 | U * | 8/2025 |
| JP | 2017199526 | A | 11/2017 |
| TW | 201346390 | A | 11/2013 |
| TW | 201423234 | A | 6/2014 |
| TW | M494939 | U * | 2/2015 |

OTHER PUBLICATIONS

Innovation Q+ NPL Search (Year: 2026).*

* cited by examiner

*Primary Examiner* — Anabel Ton

(74) *Attorney, Agent, or Firm* — CKC & Partners Co., LLC

(57) ABSTRACT

A backlight module includes a housing, a light guide plate, a light source and a flexible positioning member. The housing includes a backplate and a sidewall. The sidewall includes a first wall portion. The light guide plate is disposed in the housing and has a first lateral edge and a recess. The first lateral edge corresponds to the first wall portion of the sidewall. The recess has a side opening at the first lateral edge. The light source is disposed in the housing and faces the light guide plate. The flexible positioning member is disposed in the recess of the light guide plate and protrudes from the first lateral edge of the light guide plate via the side opening of the recess.

18 Claims, 6 Drawing Sheets

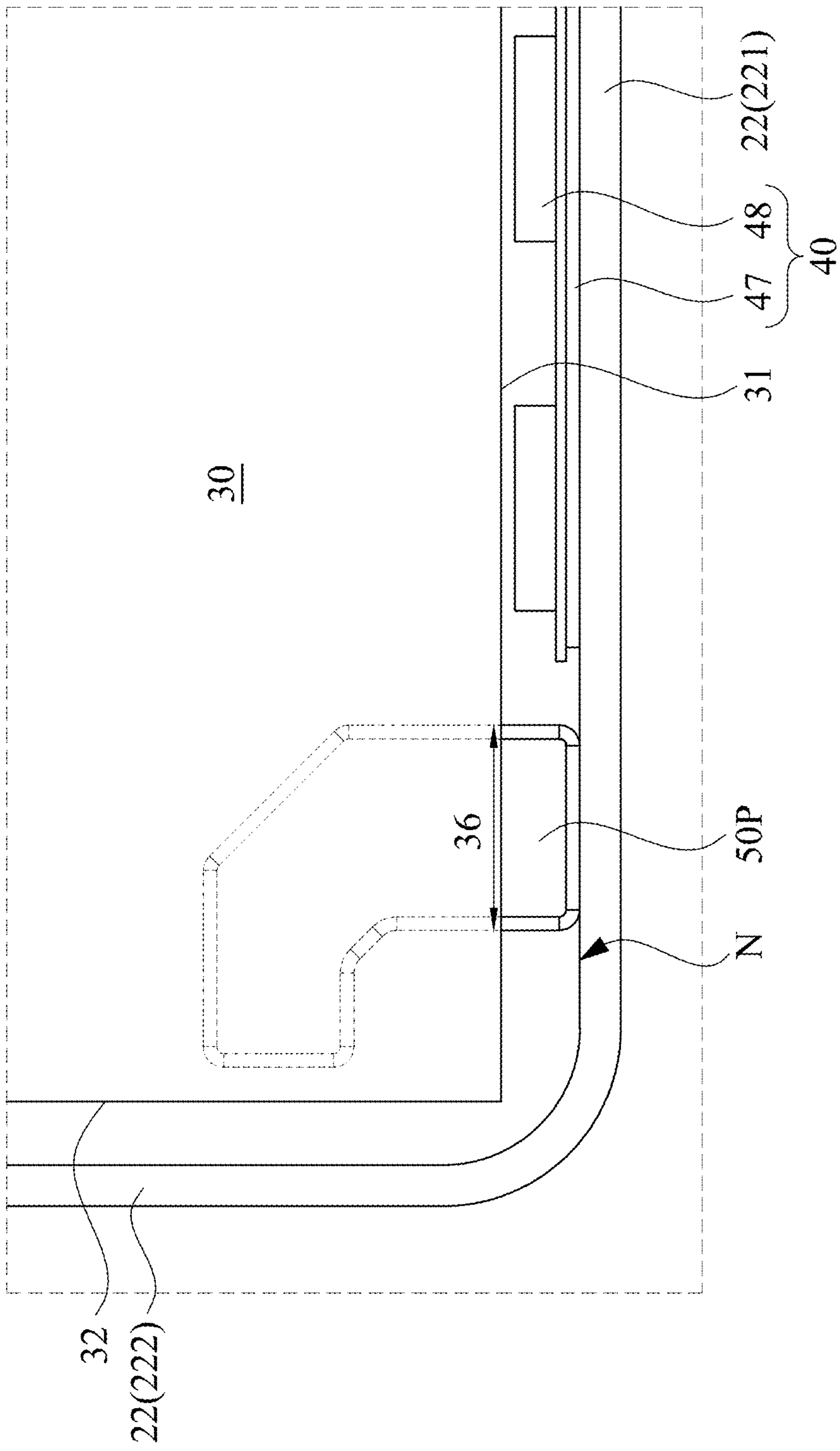
Fig. 5
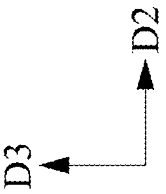

AUTOMOTIVE DISPLAY AND BACKLIGHT MODULE THEREOF

RELATED APPLICATIONS

This application claims priority to Taiwan Application Serial Number 114102374, filed Jan. 20, 2025, the disclosure of which is incorporated herein by reference in its entirety.

BACKGROUND

Technical Field

The present disclosure relates to an automotive display and a backlight module thereof.

Description of Related Art

With the growing popularity of automotive displays in modern vehicles, their applications have covered functions such as navigation systems, entertainment systems, and vehicle information displays. However, when a vehicle is moving, automotive display often experiences various forms of vibrations due to uneven road surface or as influenced by external vibrations. These vibrations not only affect the stability of displaying content, but may also cause abnormal noises created by the internal structures of the display, thus negatively affecting the user's driving experience. In view of said problem, the industry has proposed a variety of technical solutions to reduce the impact of vibrations on automotive displays.

Some of the previously proposed solutions focused on improving the structure of the housing of the display. For example, some proposed solutions involve using a harder material to create the housing, in hope of reducing the impact of vibration by improving the overall rigidity of the display. Although such design can help reduce, to a certain extent, the amplitude of vibration transmitted to the inside of the display, vibrations can still cause frictions or collisions among the optical components of the backlight module due to gaps or assembly tolerances exist among the optical components, thereby generating abnormal noises. Such abnormal noises not only affect the quietness of the vehicle, but may also indicate long-term wear of the optical components, which may result in shortened lifespan of the display.

SUMMARY

In view of the foregoing, one of the objects of the present disclosure is to provide an automotive display and a backlight module with high reliability.

In accordance with an embodiment of the present disclosure, a backlight module includes a housing, a light guide plate, a light source and at least one flexible positioning member. The housing includes a backplate and a sidewall. The sidewall includes a first wall portion. The light guide plate is disposed in the housing and has a first lateral edge and at least one recess. The first lateral edge corresponds to the first wall portion of the sidewall. The recess has a first side opening at the first lateral edge. The light source is disposed in the housing and faces the light guide plate. The flexible positioning member is disposed in the recess of the light guide plate and protrudes from the first lateral edge of the light guide plate via the first side opening of the recess.

In one or more embodiments of the present disclosure, the light source is disposed on the first wall portion of the sidewall and faces the first lateral edge of the light guide plate. The light source includes a circuit board and a plurality of light emitting elements disposed on the circuit board. The flexible positioning member is located on an outer side of the light emitting elements.

In one or more embodiments of the present disclosure, the flexible positioning member abuts against the circuit board of the light source.

In one or more embodiments of the present disclosure, the backlight module further includes a reflector sheet disposed between the light guide plate and the backplate. The flexible positioning member is disposed between the light guide plate, the reflector sheet and the circuit board of the light source.

In one or more embodiments of the present disclosure, the first wall portion of the sidewall has a region not being covered by the circuit board of the light source. The flexible positioning member abuts against the region of the first wall portion.

In one or more embodiments of the present disclosure, the flexible positioning member has an inclined structure. The inclined structure is located on a side of the flexible positioning member adjacent to the light emitting elements.

In one or more embodiments of the present disclosure, the at least one flexible positioning member and the at least one recess are both plural. The flexible positioning members and the recesses are located on two sides of the light emitting elements.

In one or more embodiments of the present disclosure, the light guide plate further has a second lateral edge adjoining the first lateral edge. The recess of the light guide plate further has a second side opening at the second lateral edge. The flexible positioning member protrudes from the second lateral edge of the light guide plate via the second side opening of the recess.

In one or more embodiments of the present disclosure, the flexible positioning member is a bent structure.

In one or more embodiments of the present disclosure, a part of the flexible positioning member extends perpendicularly to the first lateral edge of the light guide plate, and another part of the flexible positioning member extends in parallel with the first lateral edge of the light guide plate.

In accordance with an embodiment of the present disclosure, an automotive display includes a display panel and the backlight module described above. The backlight module faces a rear surface of the display panel.

In summary, the backlight module of the present disclosure includes a housing, as well as a light guide plate and a flexible positioning member disposed in the housing. The light guide plate has a recess. The flexible positioning member is fixedly received in the recess of the light guide plate and protrudes from an edge of the light guide plate. When the light guide plate expands and contracts due to temperature changes, which causes gaps to appear between the light guide plate and other components, the flexible positioning member protruding from the edge of the light guide plate can prevent the light guide plate from colliding with other components and producing abnormal noises. Hence, the backlight module of the present disclosure is suitable to be applied in environments with large temperature variations and frequent vibrations, such as on vehicles.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

FIG. 5 illustrates a partially enlarged view of a backlight module in accordance with another embodiment of the present disclosure.

DETAILED DESCRIPTION

Figure 1:
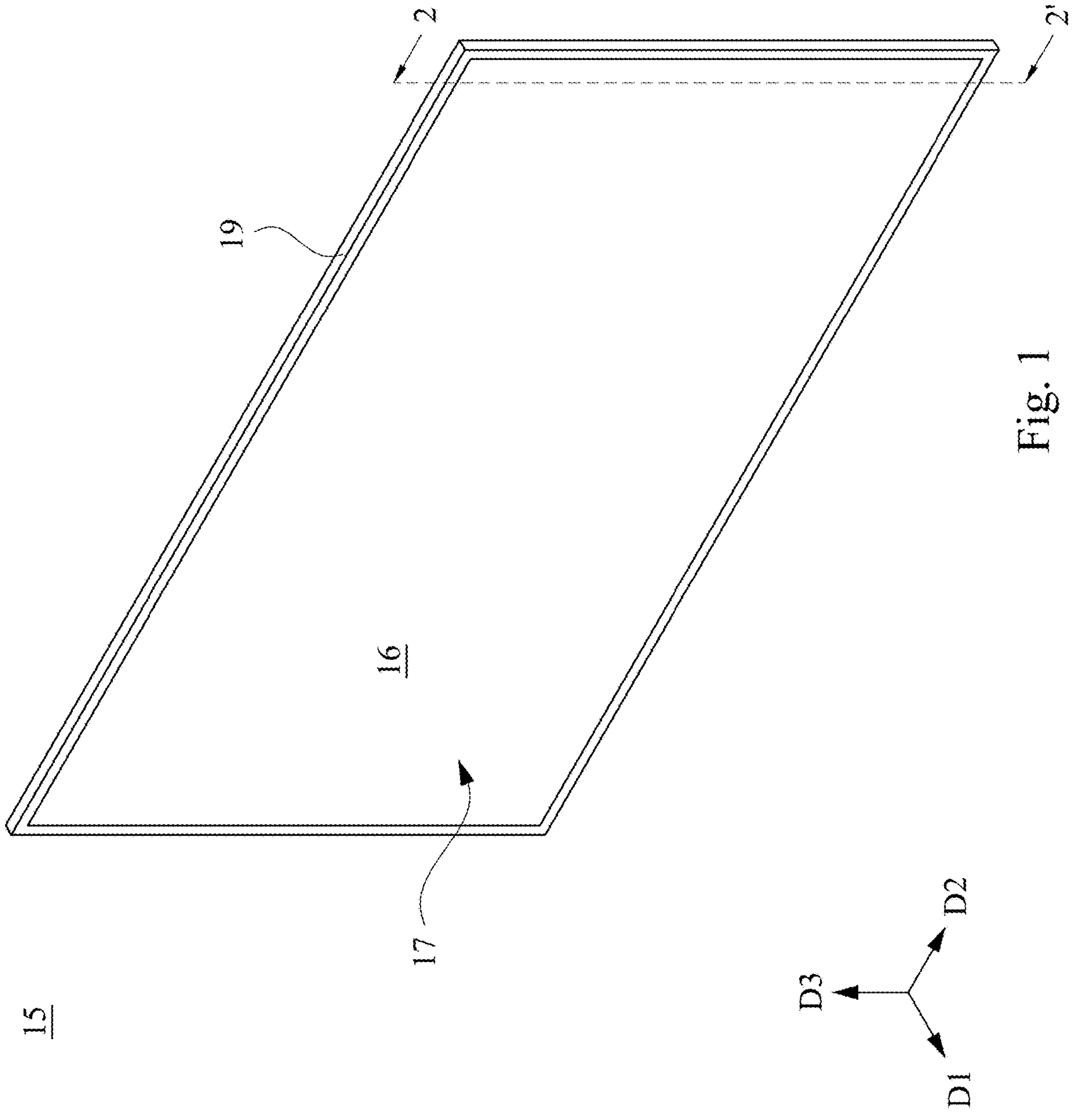
FIG. 1 illustrates an isometric view of a display device in accordance with an embodiment of the present disclosure.

For the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Reference is made to FIG. 1. FIG. 1 illustrates an isometric view of a display device 15 in accordance with an embodiment of the present disclosure. The display device 15 includes a display panel 16 (e.g., an LCD panel) and a backlight module 19. The display panel 16 has a first surface 17 and a second surface 18 (see FIG. 2) opposite to the first surface 17. The first surface 17 faces outwardly to display a screen. In other words, the first surface 17 is the display surface of the display panel 16. The second surface 18 is a rear surface of the display panel 16. The backlight module 19 is disposed facing the second surface 18 of the display panel 16. The backlight module 19 is configured to provide light to the display panel 16 to enable the display panel 16 to display a screen. The display device 15 of the present disclosure can be an automotive display, but is not limited thereto.

As shown in FIG. 1, the first surface 17 of the display panel 16 faces a first direction D1. In other words, the first direction D1 is a normal direction of the first surface 17 of the display panel 16. The display device 15 further has two edges extending along a second direction D2, as well as another two edges extending along a third direction D3. In some embodiments, the first direction D1, the second direction D2 and the third direction D3 are mutually orthogonal.

It should be noted that the first direction D1, the second direction D2 and the third direction D3 define a coordinate system associated with the display device 15 and the backlight module 19. Hence, when the orientation of the display device 15 and the backlight module 19 changes (e.g., change to a laid-down position shown in FIG. 2), this coordinate system would rotate with the display device 15 and the backlight module 19.

Figure 2:
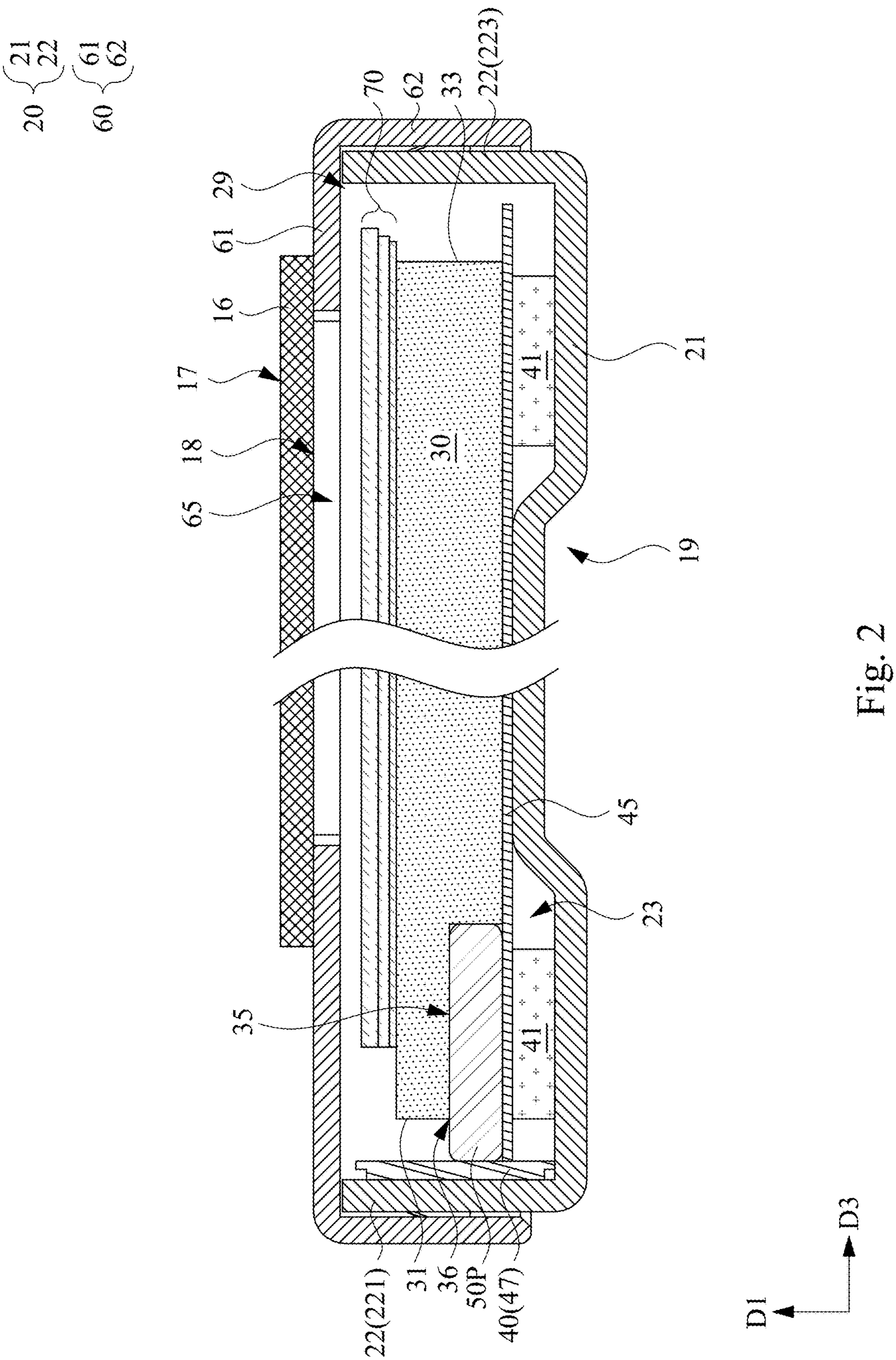
FIG. 2 illustrates a cross-sectional view of the display device shown in FIG. 1 taken along the line segment 2-2'.
Figure 3:
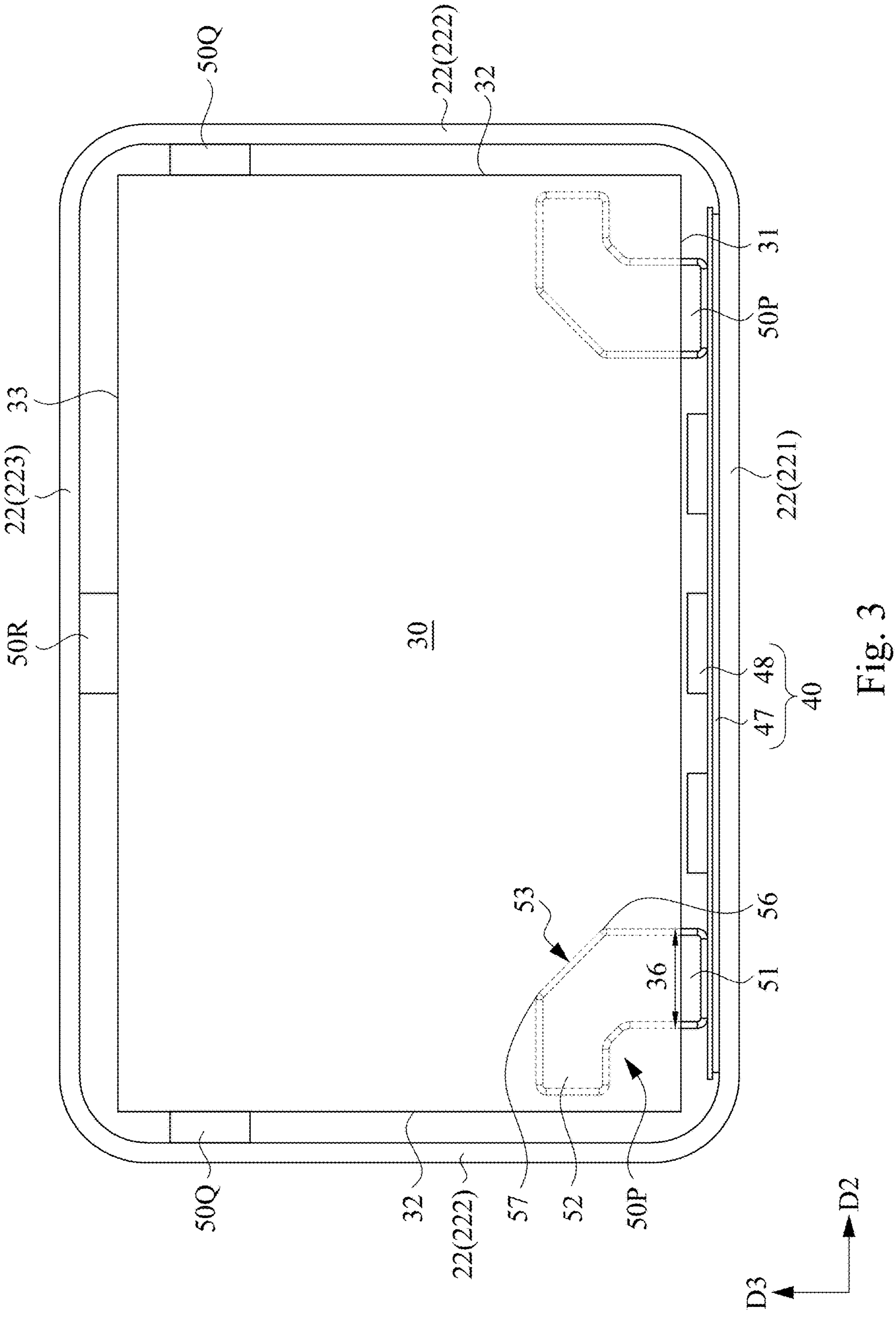
FIG. 3 illustrates a schematic front view of some components of the backlight module of the display device shown in FIG. 1.

Reference is made to FIGS. 2 and 3. FIG. 2 illustrates a cross-sectional view of the display device 15 shown in FIG. 1 taken along the line segment 2-2'. FIG. 3 illustrates a schematic front view of some components of the backlight module 19 of the display device 15 shown in FIG. 1. As shown, the backlight module 19 includes a housing 20, a light guide plate 30 and a light source 40. The housing 20 has a light exit opening 29. The second surface 18 of the display panel 16 is disposed facing the light exit opening 29 of the housing 20. The light guide plate 30 and the light source 40 are disposed in the housing 20, and the light source 40 faces the light guide plate 30. The light source 40 is configured to emit light towards the light guide plate 30, and the light is guided to the outside of the housing 20 by the light guide plate 30 through the light exit opening 29. Eventually, the light is incident on the display panel 16. The light source 40 is, for example, a light bar. The light source 40 may include a circuit board 47 and a plurality of light emitting elements 48 disposed on the circuit board 47. The light emitting elements 48 may include one or more LEDs or mini-LEDs. The light guide plate 30 is optically transparent. The light guide plate 30 can be formed of polycarbonate (PC), polymethyl methacrylate (PMMA) or other suitable materials.

As shown in FIGS. 2 and 3, the housing 20 includes a backplate 21 and a sidewall 22. The backplate 21 is opposite to the light exit opening 29. The sidewall 22 is connected to the backplate 21 and bent relative to the backplate 21. The sidewall 22 includes a first wall portion 221. The light guide plate 30 has a first lateral edge 31 corresponding to the first wall portion 221 of the sidewall 22. The light source 40 is disposed on the first wall portion 221 of the sidewall 22 and faces the first lateral edge 31 of the light guide plate 30. In other words, the backlight module 19 of the present disclosure is an edge-lit backlight module. In some embodiments, the first wall portion 221 of the sidewall 22 is at the bottom of the backlight module 19. The first wall portion 221 of the sidewall 22 and the first lateral edge 31 of the light guide plate 30 extend substantially along the second direction D2.

As shown in FIGS. 2 and 3, in some embodiments, the sidewall 22 is arranged around the backplate 21 on four sides. Specifically, the sidewall 22 further includes two second wall portions 222 and a third wall portion 223. The third wall portion 223 is opposite to the first wall portion 221. The two second wall portions 222 adjoin the first wall portion 221. Two ends of each second wall portion 222 are connected to the first wall portion 221 and the third wall portion 223, respectively. Correspondingly, the light guide plate 30 can have two second lateral edges 32 and a third lateral edge 33. The third lateral edge 33 is opposite to the first lateral edge 31. The two second lateral edges 32 adjoin the first lateral edge 31. Two ends of each second lateral edge 32 are connected to the first lateral edge 31 and the third lateral edge 33, respectively. The two second lateral edges 32 correspond to the two second wall portions 222 of the sidewall 22, respectively, and the third lateral edge 33 corresponds to the third wall portion 223 of the sidewall 22.

As shown in FIGS. 2 and 3, the backlight module 19 further includes at least one flexible positioning member disposed in the housing 20 and configured to hold the light guide plate 30 in position. The at least one flexible positioning member can include at least one first flexible positioning member 50P protruding from the first lateral edge 31 of the light guide plate 30. The first flexible positioning member 50P can restrain movement of the light guide plate 30 in the third direction D3 to prevent the light guide plate 30 from colliding with the light source 40 or the sidewall 22 of the housing 20. Moreover, the first flexible positioning member 50P is located on an outer side of the light emitting elements 48 of the light source 40 to avoid interference with the light output of the light emitting elements 48. The flexible positioning member may include elastomer material, such as rubber.

As shown in FIGS. 2 and 3, the light guide plate 30 further has at least one recess 35. In the present embodiment, the recess 35 is located on a side of the light guide plate 30 facing the backplate 21. The recess 35 has a first side opening 36 at the first lateral edge 31 of the light guide plate 30. The first flexible positioning member 50P is disposed in the recess 35 of the light guide plate 30 and protrudes from the first lateral edge 31 of the light guide plate 30 via the first side opening 36 of the recess 35. In FIG. 3, the part of the first flexible positioning member 50P inside the recess 35 is shown in dotted lines, and the part of the first flexible positioning member 50P outside the recess 35 is shown in solid lines. The shape of the recess 35 can match that of the first flexible positioning member 50P, allowing the first flexible positioning member 50P to be securely retained in the recess 35. Alternatively, the first flexible positioning member 50P can be fixedly attached to the light guide plate 30 using adhesives.

As shown in FIGS. 2 and 3, in the present embodiment, the first flexible positioning member 50P protruding from the first lateral edge 31 of the light guide plate 30 abuts against the circuit board 47 of the light source 40, so as to restrain movement of the light guide plate 30. In addition, when the temperature changes cause significant contraction in the size of the light guide plate 30, displacement of the light guide plate 30 may still occur. In this case, the first flexible positioning member 50P protruding from the first lateral edge 31 of the light guide plate 30 can prevent the light guide plate 30 from colliding with the light source 40 and creating abnormal noises. In other words, the first flexible positioning member 50P can also provide cushioning function.

As shown in FIGS. 2 and 3, in some embodiments, a plurality of first flexible positioning member 50P and a plurality of recess 35 of the light guide plate 30 are located on two sides of the light emitting elements 48 of the light source 40. For example, in the illustrated embodiment, the light guide plate 30 has one recess 35 at each corner on the two ends of the first lateral edge 31, and each of the first flexible positioning members 50P is received in a corresponding recess 35.

As shown in FIGS. 2 and 3, in some embodiments, the first flexible positioning member 50P has an inclined structure 53, such as a chamfer or a bevel. The inclined structure 53 is located on a side of the first flexible positioning member 50P adjacent to the light emitting elements 48. The inclined structure 53 can help prevent the light emitted by the light emitting elements 48 from being blocked by the first flexible positioning member 50P, which may result in dark zone on the display screen. In some embodiments, the first flexible positioning member 50P can be optically transparent. For example, the first flexible positioning member 50P can be made of transparent rubber material. Such an arrangement can also help prevent the light emitted by the light emitting elements 48 from being blocked by the first flexible positioning member 50P.

As shown in FIGS. 2 and 3, in some embodiments, the at least one flexible positioning member can further include at least one second flexible positioning member 50Q. The second flexible positioning member 50Q is disposed at the second lateral edge 32 of the light guide plate 30 and abuts against the second wall portion 222 of the sidewall 22 to restrain movement of the light guide plate 30 in the second direction D2. In some embodiments, the at least one flexible positioning member can further include at least one third flexible positioning member 50R. The third flexible positioning member 50R is disposed at the third lateral edge 33 of the light guide plate 30 and abuts against the third wall portion 223 of the sidewall 22 to restrain movement of the light guide plate 30 in the third direction D3.

As shown in FIGS. 2 and 3, in the illustrated embodiment, the second flexible positioning member 50Q is clamped between the second lateral edge 32 of the light guide plate 30 and the second wall portion 222 of the sidewall 22, and the third flexible positioning member 50R is clamped between the third lateral edge 33 of the light guide plate 30 and the third wall portion 223 of the sidewall 22. In other embodiments, the second flexible positioning member 50Q and the third flexible positioning member 50R can be arranged in a manner similar to the first flexible positioning member 50P, i.e., the second flexible positioning member 50Q can be disposed in a recess of the light guide plate 30 and partially protrude from the second lateral edge 32 of the light guide plate 30, and/or the third flexible positioning member 50R can be disposed in a recess of the light guide plate 30 and partially protrude from the third lateral edge 33 of the light guide plate 30.

As shown in FIGS. 2 and 3, in some embodiments, the backlight module 19 further includes a reflector sheet 45. The reflector sheet 45 is disposed between the light guide plate 30 and the backplate 21 of the housing 20 and covers a rear surface of the light guide plate 30. The reflector sheet 45 can reflect light and cause light to travel towards the display panel 16. In some embodiments, the reflector sheet 45 covers the recess 35 of the light guide plate 30, and the first flexible positioning member 50P is disposed between the light guide plate 30, the reflector sheet 45 and the circuit board 47 of the light source 40.

As shown in FIGS. 2 and 3, in some embodiments, the backplate 21 of the housing 20 has at least one groove 23. The groove 23 is formed next to the sidewall 22 and extends substantially in parallel with the sidewall 22. The backlight module 19 can further include at least one spacer 41. The spacer 41 is disposed in the groove 23 to provide support for the reflector sheet 45 and the light guide plate 30. The spacer 41 may have, for example, a strip shape. The spacer 41 may include elastomer material, such as rubber.

As shown in FIGS. 2 and 3, in some embodiments, the backlight module 19 further includes at least one optical film 70. The optical film 70 is disposed on a side of the light guide plate 30 away from the backplate 21. In other words, the light guide plate 30 is disposed between the backplate 21 and the optical film 70. The optical film 70 may include at least one of a diffuser film, a prism film, a brightness enhancement film, or optical films having other functions. In some embodiments, the backlight module 19 includes a plurality of optical films 70 stacked with the light guide plate 30.

As shown in FIGS. 2 and 3, in some embodiments, the backlight module 19 further includes a frame 60. The frame 60 is disposed on the housing 20 and is configured to support the display panel 16. The frame 60 can have a light exit opening 65 to allow the light emitted by the light source 40 to be incident on the display panel 16. In some embodiments, the frame 60 includes a first portion 61 and a second portion 62 connected to the first portion 61. The first portion 61 covers peripheral regions of the optical film 70 and the light guide plate 30. The display panel 16 is disposed on the first portion 61 of the frame 60. The second portion 62 of the frame 60 is bent relative to the first portion 61 and extends to an outer side of the sidewall 22 of the housing 20. The second portion 62 of the frame 60 can be fixed to the sidewall 22 of the housing 20 by snap-fit engagement, adhesive bonding or other suitable means.

Figure 4:
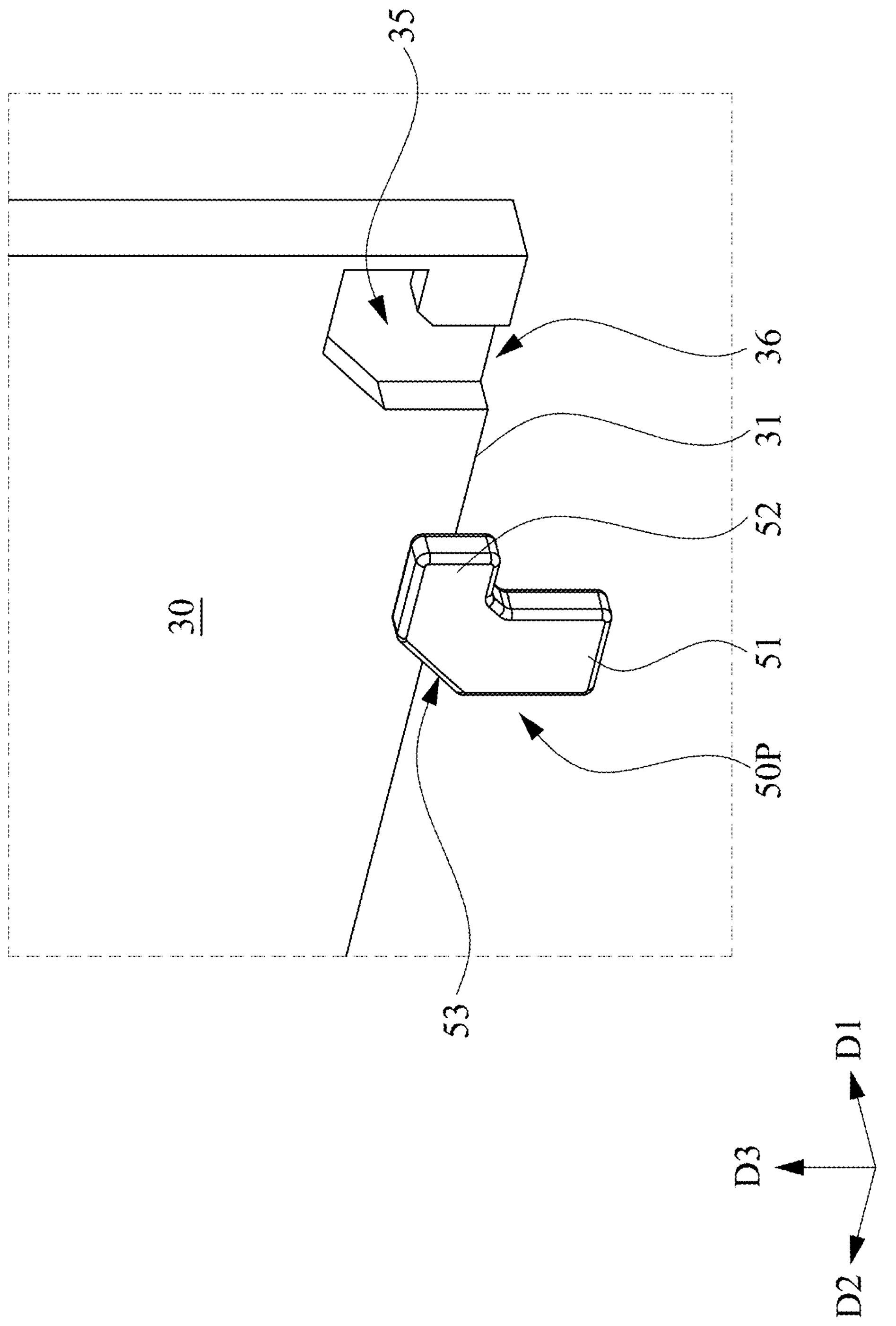
FIG. 4 illustrates an exploded view of the light guide plate and the first flexible positioning member shown in FIG. 3.

Reference is made additionally to FIG. 4. FIG. 4 illustrates an exploded view of the light guide plate 30 and the first flexible positioning member 50P shown in FIG. 3. As shown in FIGS. 3 and 4, in some embodiments, the first flexible positioning member 50P is a bent structure. In other words, the first flexible positioning member 50P includes two non-parallel portions. In the illustrated embodiment, the first flexible positioning member 50P includes a first extending portion 51 and a second extending portion 52 at a non-straight angle to the first extending portion 51, so that the first extending portion 51 is not parallel to the second extending portion 52. Correspondingly, the recess 35 of the light guide plate 30 can be a recess having a bent shape to accommodate the first flexible positioning member 50P. When the backlight module 19 is in a high-temperature environment which causes the various components of the backlight module 19 to expand, the first flexible positioning member 50P having a bent shape is less likely to be squeezed out of the recess 35 of the light guide plate 30.

As shown in FIGS. 3 and 4, in some embodiments, the first extending portion 51 of the first flexible positioning member 50P extends substantially perpendicularly to the first lateral edge 31 of the light guide plate 30, and the second extending portion 52 of the first flexible positioning member 50P extends substantially in parallel with the first lateral edge 31 of the light guide plate 30. In some embodiments, the inclined structure 53 is formed at a corner of the first extending portion 51 and the second extending portion 52. The inclined structure 53 can have a first end 56 and a second end 57 opposite to the first end 56. The second end 57 is farther away from the light emitting elements 48 than the first end 56 in the second direction D2 and the third direction D3.

Reference is made to FIG. 5. FIG. 5 illustrates a partially enlarged view of a backlight module in accordance with another embodiment of the present disclosure. The present embodiment differs from the embodiments described above in that: the first wall portion 221 of the sidewall 22 has a region N not being covered by the circuit board 47 of the light source 40, and the first flexible positioning member 50P protruding from the first lateral edge 31 of the light guide plate 30 abuts against the region N of the first wall portion 221. Such an arrangement can also provide positioning and cushioning function for the light guide plate 30.

Figure 6:
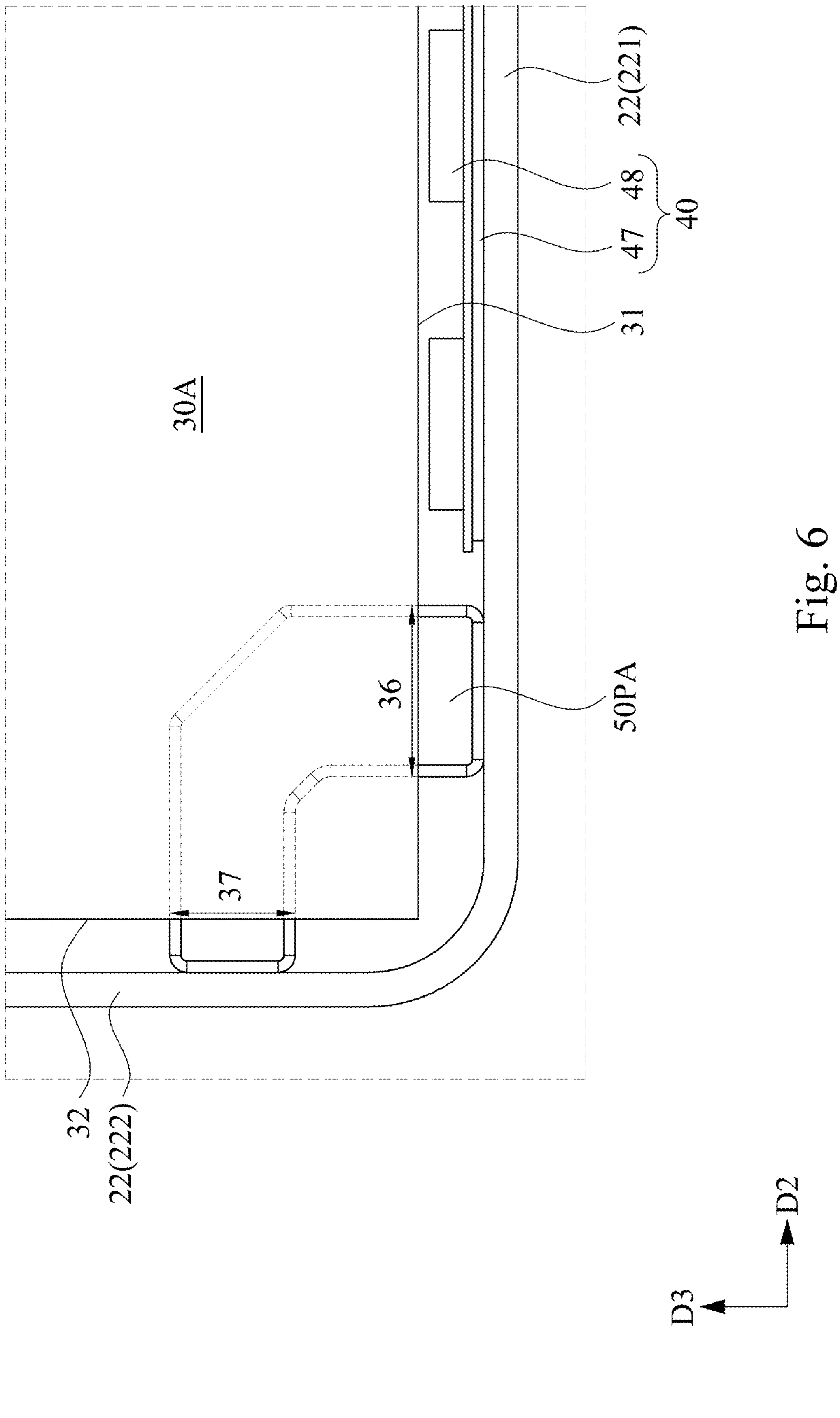
FIG. 6 illustrates a partially enlarged view of a backlight module in accordance with another embodiment of the present disclosure.

Reference is made to FIG. 6. FIG. 6 illustrates a partially enlarged view of a backlight module in accordance with another embodiment of the present disclosure. The present embodiment differs from the embodiments described above in that: the recess of the light guide plate 30A further has a second side opening 37 at the second lateral edge 32 of the light guide plate 30A, and the first flexible positioning member 50PA not only protrudes from the first lateral edge 31 of the light guide plate 30A, but also protrudes from the second lateral edge 32 of the light guide plate 30A through the second side opening 37 of the recess. The portion of the first flexible positioning member 50PA protruding from the second lateral edge 32 of the light guide plate 30A can abut against the second wall portion 222 of the sidewall 22. Consequently, the first flexible positioning member 50PA of the present embodiment can provide positioning and cushioning function for the light guide plate 30A in two different directions.

In summary, the backlight module of the present disclosure includes a housing, as well as a light guide plate and a flexible positioning member disposed in the housing. The light guide plate has a recess. The flexible positioning member is fixedly received in the recess of the light guide plate and protrudes from an edge of the light guide plate. When the light guide plate expands and contracts due to temperature changes, which causes gaps to appear between the light guide plate and other components, the flexible positioning member protruding from the edge of the light guide plate can prevent the light guide plate from colliding with other components and producing abnormal noises. Hence, the backlight module of the present disclosure is suitable to be applied in environments with large temperature variations and frequent vibrations, such as on vehicles.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A backlight module, comprising:

a housing comprising a backplate and a sidewall, the sidewall comprising a first wall portion;

a light guide plate disposed in the housing and having a first lateral edge and at least one recess, the first lateral edge corresponding to the first wall portion of the sidewall, the at least one recess having a first side opening at the first lateral edge;

a light source disposed in the housing and facing the light guide plate; and at least one flexible positioning member disposed in the at least one recess of the light guide plate and protruding from the first lateral edge of the light guide plate via the first side opening of the at least one recess, wherein the light source is disposed on the first wall portion of the sidewall and faces the first lateral edge of the light guide plate, wherein the light source comprises a circuit board and a plurality of light emitting elements disposed on the circuit board, and the at least one flexible positioning member is located on an outer side of the light emitting elements.

2. The backlight module of claim 1, wherein the at least one flexible positioning member abuts against the circuit board of the light source.

3. The backlight module of claim 2, further comprising a reflector sheet disposed between the light guide plate and the backplate, wherein the at least one flexible positioning member is disposed between the light guide plate, the reflector sheet and the circuit board of the light source.

4. The backlight module of claim 1, wherein the first wall portion of the sidewall has a region not being covered by the circuit board of the light source, and the at least one flexible positioning member abuts against the region of the first wall portion.

5. The backlight module of claim 1, wherein the at least one flexible positioning member has an inclined structure, and the inclined structure is located on a side of the at least one flexible positioning member adjacent to the light emitting elements.

6. The backlight module of claim 1, wherein the at least one flexible positioning member and the at least one recess are both plural, and the flexible positioning members and the recesses are located on two sides of the light emitting elements.

7. The backlight module of claim 1, wherein the light guide plate further has a second lateral edge adjoining the first lateral edge, the at least one recess of the light guide plate further has a second side opening at the second lateral edge, and the at least one flexible positioning member protrudes from the second lateral edge of the light guide plate via the second side opening of the at least one recess.

8. A backlight module, comprising:

a housing comprising a backplate and a sidewall, the sidewall comprising a first wall portion;

a light guide plate disposed in the housing and having a first lateral edge and at least one recess, the first lateral edge corresponding to the first wall portion of the sidewall, the at least one recess having a first side opening at the first lateral edge;

a light source disposed in the housing and facing the light guide plate; and at least one flexible positioning member disposed in the at least one recess of the light guide plate and protruding from the first lateral edge of the light guide plate via the first side opening of the at least one recess, wherein the at least one flexible positioning member is a bent structure.

9. The backlight module of claim 8, wherein a part of the at least one flexible positioning member extends perpendicularly to the first lateral edge of the light guide plate, and another part of the at least one flexible positioning member extends in parallel with the first lateral edge of the light guide plate.

10. An automotive display, comprising:

a display panel; and a backlight module facing a rear surface of the display panel, the backlight module comprising:

a housing comprising a backplate and a sidewall, the sidewall comprising a first wall portion;

a light guide plate disposed in the housing and having a first lateral edge and at least one recess, the first lateral edge corresponding to the first wall portion of the sidewall, the at least one recess having a first side opening at the first lateral edge;

a light source disposed in the housing and facing the light guide plate; and at least one flexible positioning member disposed in the at least one recess of the light guide plate and protruding from the first lateral edge of the light guide plate via the first side opening of the at least one recess, wherein the light guide plate further has a second lateral edge adjoining the first lateral edge, the at least one recess of the light guide plate further has a second side opening at the second lateral edge, and the at least one flexible positioning member protrudes from the second lateral edge of the light guide plate via the second side opening of the at least one recess.

11. The automotive display of claim 10, wherein the light source is disposed on the first wall portion of the sidewall and faces the first lateral edge of the light guide plate, wherein the light source comprises a circuit board and a plurality of light emitting elements disposed on the circuit board, and the at least one flexible positioning member is located on an outer side of the light emitting elements.

12. The automotive display of claim 11, wherein the at least one flexible positioning member abuts against the circuit board of the light source.

13. The automotive display of claim 12, wherein the backlight module further comprises a reflector sheet disposed between the light guide plate and the backplate, and the at least one flexible positioning member is disposed between the light guide plate, the reflector sheet and the circuit board of the light source.

14. The automotive display of claim 11, wherein the first wall portion of the sidewall has a region not being covered by the circuit board of the light source, and the at least one flexible positioning member abuts against the region of the first wall portion.

15. The automotive display of claim 11, wherein the at least one flexible positioning member has an inclined structure, and the inclined structure is located on a side of the at least one flexible positioning member adjacent to the light emitting elements.

16. The automotive display of claim 11, wherein the at least one flexible positioning member and the at least one recess are both plural, and the flexible positioning members and the recesses are located on two sides of the light emitting elements.

17. The automotive display of claim 10, wherein the at least one flexible positioning member is a bent structure.

18. The automotive display of claim 17, wherein a part of the at least one flexible positioning member extends perpendicularly to the first lateral edge of the light guide plate, and another part of the at least one flexible positioning member extends in parallel with the first lateral edge of the light guide plate.

* * * * *